United States Patent [19]

Lasoen

[11] Patent Number: 4,811,614

[45] Date of Patent: Mar. 14, 1989

[54] POWER TAKE-OFF DRIVE UNIT

[75] Inventor: Jean J. Lasoen, Villepreux, France

[73] Assignee: Massey-Ferguson Services N.V., Curacao, Netherlands Antilles

[21] Appl. No.: 97,024

[22] Filed: Sep. 16, 1987

[30] Foreign Application Priority Data

Oct. 3, 1986 [GB] United Kingdom ............... 8623857

[51] Int. Cl.⁴ ................. B60K 17/28; B60K 25/02; F16D 67/04

[52] U.S. Cl. .................. 74/15.63; 74/15.6; 74/397; 180/53.7; 192/15; 192/70.12; 192/85 AA; 192/113 B

[58] Field of Search ............... 74/15.6, 15.63, 15.66, 74/15.69, 397; 180/53.7; 192/12 D, 15, 18 B, 18 A, 70.12, 85 AA, 113 B

[56] References Cited

U.S. PATENT DOCUMENTS

| 936,284 | 10/1909 | Abernethy | 192/18 B |
|---|---|---|---|
| 2,614,396 | 10/1952 | Ratermann | 192/85 AA X |
| 3,001,409 | 9/1961 | Von Fumetti | 74/11 |
| 3,669,229 | 6/1972 | Ronayne et al. | 192/12 C |
| 4,060,159 | 11/1977 | Chaney et al. | 192/113 B |
| 4,183,425 | 1/1980 | Sommer | 192/113 B |
| 4,403,671 | 9/1983 | Schmahl | 180/53.7 |
| 4,488,447 | 12/1984 | Gebhardt | 74/397 |
| 4,739,865 | 4/1988 | Yater et al. | 192/113 B X |

FOREIGN PATENT DOCUMENTS

| 1655950 | 9/1971 | Fed. Rep. of Germany . |
| 3017506 | 11/1980 | Fed. Rep. of Germany . |
| 1343253 | 1/1974 | United Kingdom . |
| 1550259 | 8/1979 | United Kingdom . |

Primary Examiner—Allan D. Herrmann

[57] ABSTRACT

A power take-off drive unit for use at the front of a tractor, in which a housing supports input and output shafts for rotation with the input shaft above the output shaft and a gear train connecting the two shafts. An oil-cooled clutch is provided within the housing which is mounted concentrically with the higher input shaft. Coolant oil is supplied to cool the clutch and a scavenging pump is driven from the input shaft for scavenging coolant oil from within the housing to ensure an oil level within the housing below the clutch to minimize the power losses due to churning of the clutch within the coolant oil while still immersing at least part of the gear train. A bearing support for a pivot of a front axle of the tractor is also carried by the housing.

9 Claims, 5 Drawing Sheets

POWER TAKE-OFF DRIVE UNIT

This invention relates to power take-off (PTO) drive units and particularly to such units suitable for providing a PTO drive at the front of an agricultural or industrial tractor.

Although many such units have been proposed, difficulties frequently arise with such units due to rapid clutch wear. Also such units are frequently bulky and this often gives rise to difficulty in conveniently locating the unit at the front of a tractor.

It is an object of the present invention to provide a PTO drive unit which has a good clutch life and in one configuration produces a particularly compact arrangement.

Thus according to the present invention there is provided a PTO drive unit comprising:
a housing;
an input shaft and an output shaft rotatably supported by the housing;
an oil-cooled clutch within the housing for connecting/disconnecting drive between the input and output shafts;
means for supplying coolant oil to the clutch, and
a scavenging pump driven from one of the shafts for scavenging coolant oil from within the housing to ensure an oil level within said housing which reduces the power losses due to churning of the clutch within the coolant oil.

In a preferred arrangement the two shafts are supported by the housing at different levels and a gear train extends between the two shafts with the clutch mounted concentrically with the upper shaft. In such an arrangement the scavenging pump can be arranged to keep the oil level below the clutch whilst still immersing at least part of the gear train.

Conveniently the scavenging pump can be of the gerotor type and driven from the input shaft to ensure a scavenging action at all times.

In a preferred form of the invention the housing for the PTO drive forms part of a front axle support structure of a tractor thus providing a particularly compact arrangement.

The drive unit preferably includes a brake for preventing rotation of the output shaft due to clutch drag when the clutch is disengaged. Conveniently this brake may be of an electro-magnetic type.

Conveniently the clutch may be hydraulically actuated and may use the same fluid for actuation and cooling.

One embodiment of the present invention will now be described, by way of example only, with reference to the accompanying drawings in which.

Figure 1:
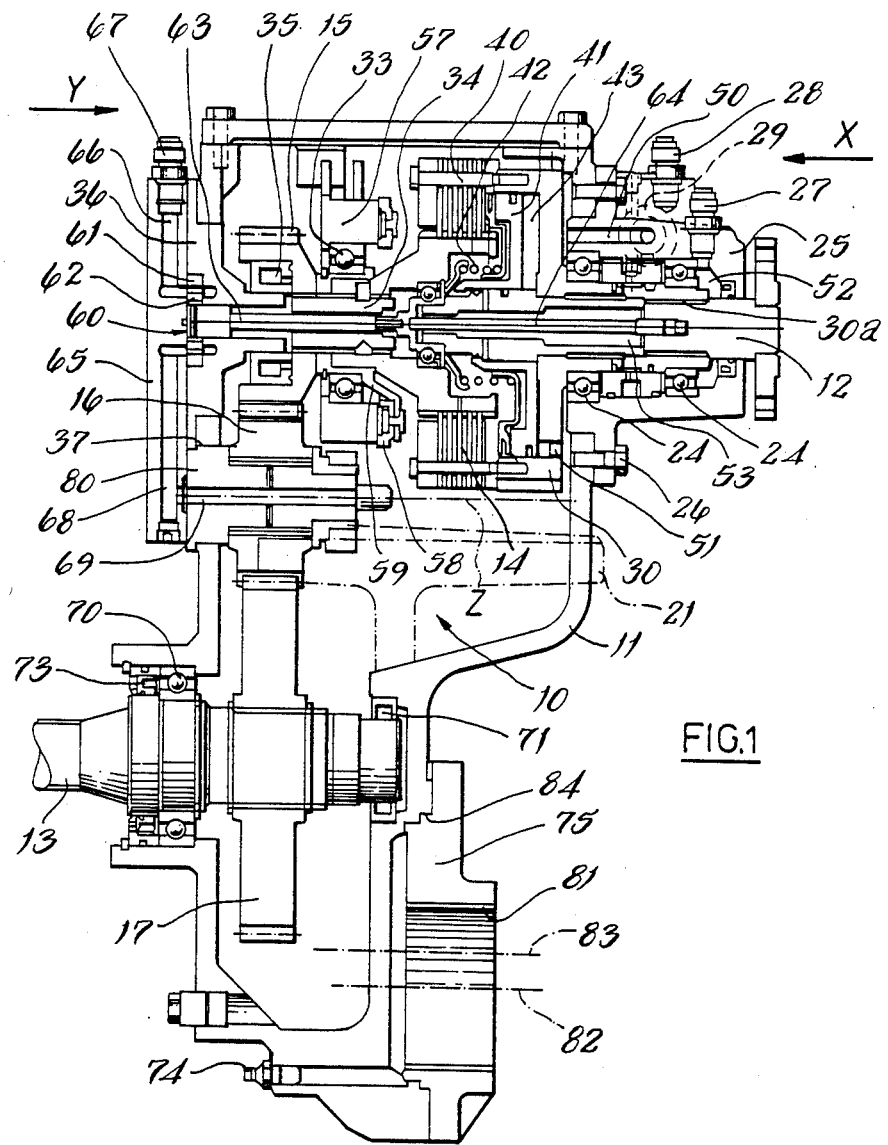
FIG. 1 is a vertical section through a front PTO drive unit embodying the present invention suitable for use in an agricultural tractor.

Referring to FIG. 1, this shows a PTO drive unit 10 having a housing 11 which supports an input shaft 12 and a conventional splined output shaft 13. Input shaft 12 is connected with output shaft 13 via an hydraulically actuated and oil-cooled multi-plate clutch 14 and a vertical gear train 15,16 and 17.

Figure 2:
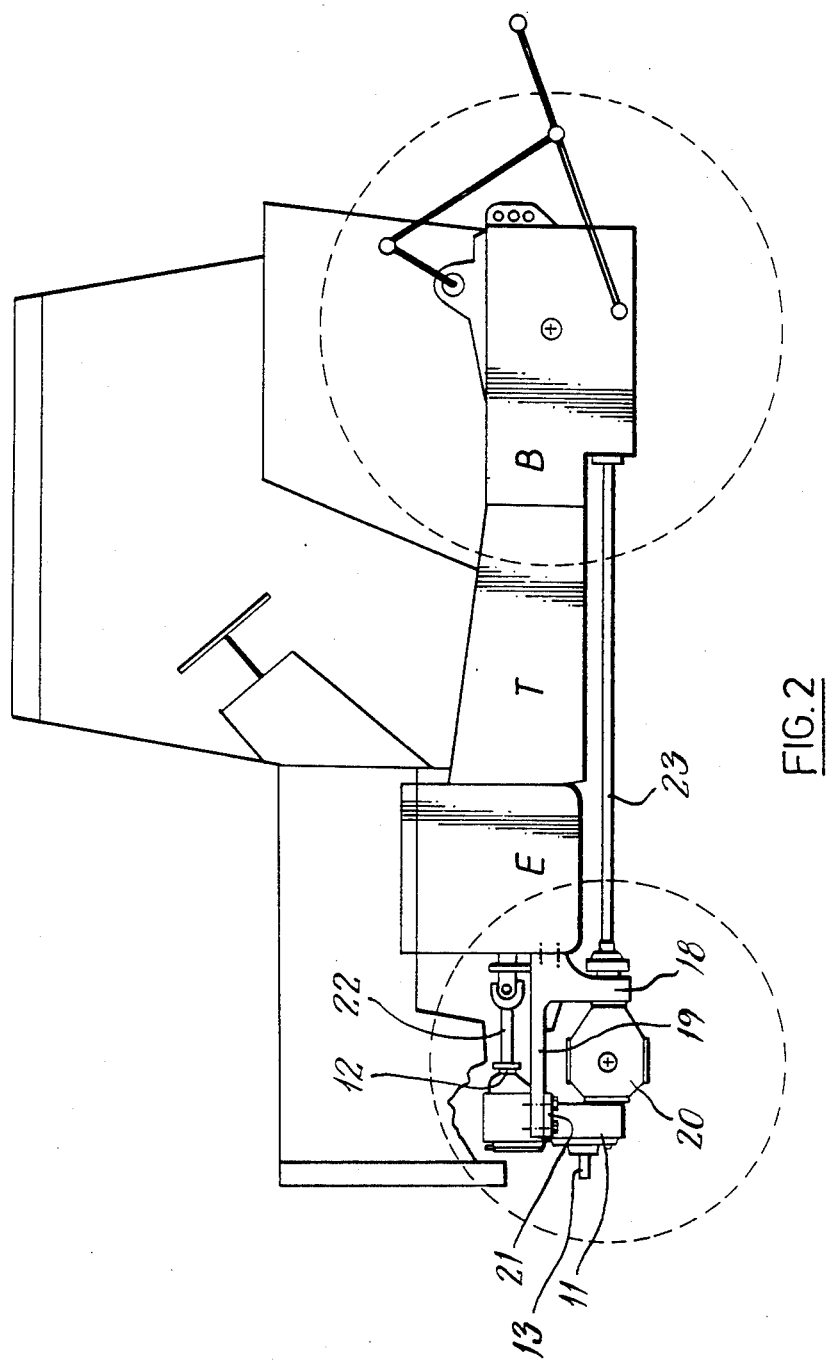
FIG. 2 is a diagrammatic representation of a tractor showing the disposition and connections of the PTO drive unit of FIG. 1.

As can be seen from FIG. 2, in the particular embodiment described, the housing 11 forms the front part of the front axle support of the associated tractor. The actual support is completed by a rear bearing support member 18 which has a bridging section 19 which spans the associated front axle differential 20 and is bolted to the housing 11 via flanges 21 thereon. The rear bearing support member 11 and integral bridging section 19 are in turn bolted to the engine block E of the tractor in the known manner.

Drive to the input shaft 12 is via a shaft 22 which is directly connected with the crankshaft of the engine E. Also, in a conventional manner, the front axle differential 20 is driven via a shaft 23 which extends from the back axle housing B of the tractor. The back axle housing B, the engine block E and the transmission housing T form the chassis of the tractor in the usual manner.

The input shaft 12 is supported via bearings 24 in a demountable casting 25 which is secured to the remainder of the housing 11 using bolts 26. The casting 25 includes an oil coolant inlet 27 and a clutch actuating fluid inlet 28 with its associated solenoid-operated valve 29. Output shaft 13 is supported from housing 11 via bearings 70 and 71, and is sealed by seal 73.

Figure 5:
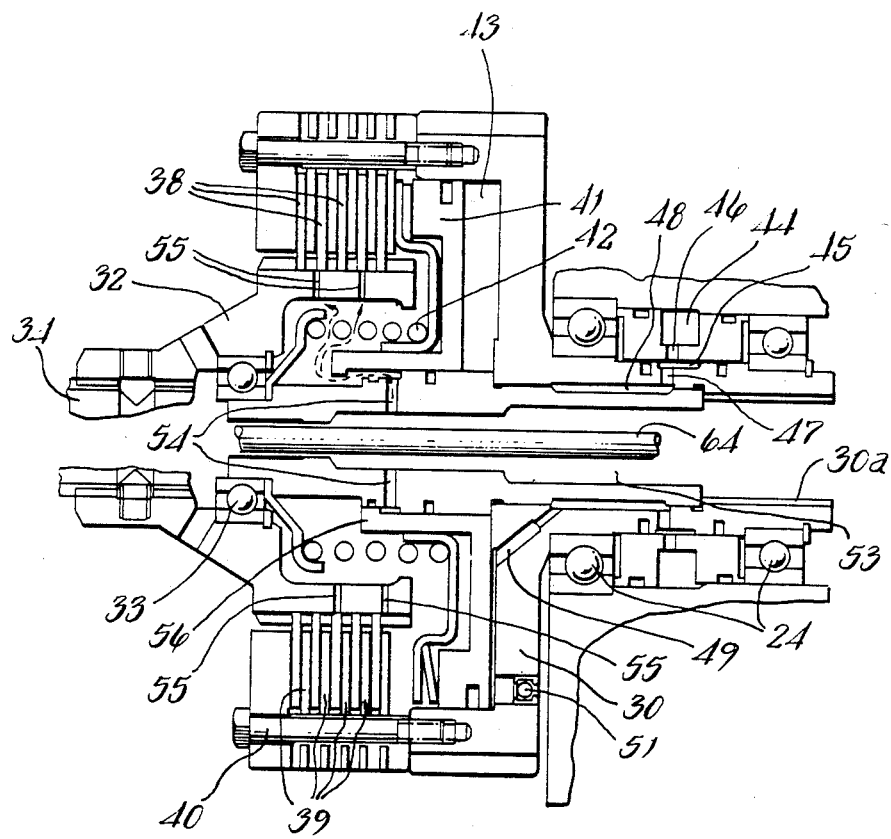
FIG. 5 shows the clutch of the drive unit on a larger scale.

Turning now to details of the clutch 14, which is shown on a larger scale in FIG. 5, this has an input member 30 which is splined to the input shaft 12 at 30a and supported from the casting 25 via bearings 24. An output member 32 of the clutch 14 is supported by bearing 33 and is splined onto a shaft 34 on which gear 15 is also splined. Gear 15 is also supported by bearing 35 which is carried by a casting 36 located in an aperture 37 in the housing 11.

Clutch discs 38 are splined onto output member 32 and interleaved between clutch discs 39 carried on pins 40 which are screwed into input member 30. An hydraulic piston 41 is provided to compress the interleaved clutch discs 38 and 39 against the action of a release spring 42 in order to engage the clutch. The piston 41 is displaced by pressurising chamber 43 under the control of solenoid valve 29. Pressurised fluid is supplied to chamber 43 from valve 29 via annular chambers 44 and 45, drillings 46 and 47, annular chamber 48 and drilling 49. When the clutch 14 is released the pressurised fluid in chamber 43 is vented via valve 29 and passage 50 (FIG. 1) into the interior of housing 11. Venting also occurs via a centrifugal check valve 51 in the known manner.

The coolant entering housing 11 via inlet 27 passes into chamber 52 an hence via the splines 30a and other drillings (not shown) into an interior cavity 53. Coolant then flows from cavity 53 radially outwardly through the clutch discs 38 and 39 into the housing in 11 via drillings 54 and 55 . In the bottom half of the depiction of clutch 14 in FIGS. 1 and 5 it will be observed that in a known manner a nose portion 56 of piston 41 closes off the drillings 54 when the clutch is disengaged thus cutting off the flow of coolant between the clutch discs and hence assisting in minimising clutch drag when the clutch is disengaged. Housing 11 is vented by a breather device 79.

Rotation of output shaft 13 when the clutch 14 is disengaged is prevented by a electro-magnetic brake which consists of a stationary toroidal coil arrangement 57 and a rotatable ferro-magnetic element 58 which is carried on arms 59 which are splined onto shaft 34. When coil 57 is energised any tendency of the ferro-magnetic element 58 to rotate is arrested and hence shaft 34 and the associated gear train 15, 16 and 17 with output shaft 13 is also held stationary.

Figure 6:
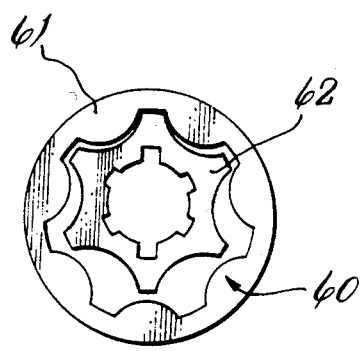
FIG. 6 show part of the scavenging pump used in the PTO drive unit of FIG. 1.

In accordance with the present invention a scavenging pump 60 of the gerotor type is provided. The outer element 61 (see FIG. 6) of the pump is housed in casting 36 whilst the inner element 62 is driven via shafts 63 and 64 from the input shaft 12. The enclosure of the pump is completed by a casting 65 which is bolted onto the front of housing 11 and which contains an outlet passageway 66 and connection 67 and a suction passageway 68 which draws oil from within the housing 11 via a communicating passageway 69 down the centre of shaft 80 which supports gear 16. Thus the presence of the pump 60 is able to maintain a level of oil within housing 11 at the levels Z indicated in FIG. 1. This ensures that the clutch 14 and the majority of the vertical gear train 15, 16 and 17 is not immersed in the oil so that power losses due to churning of the oil are minimised.

Figure 3:
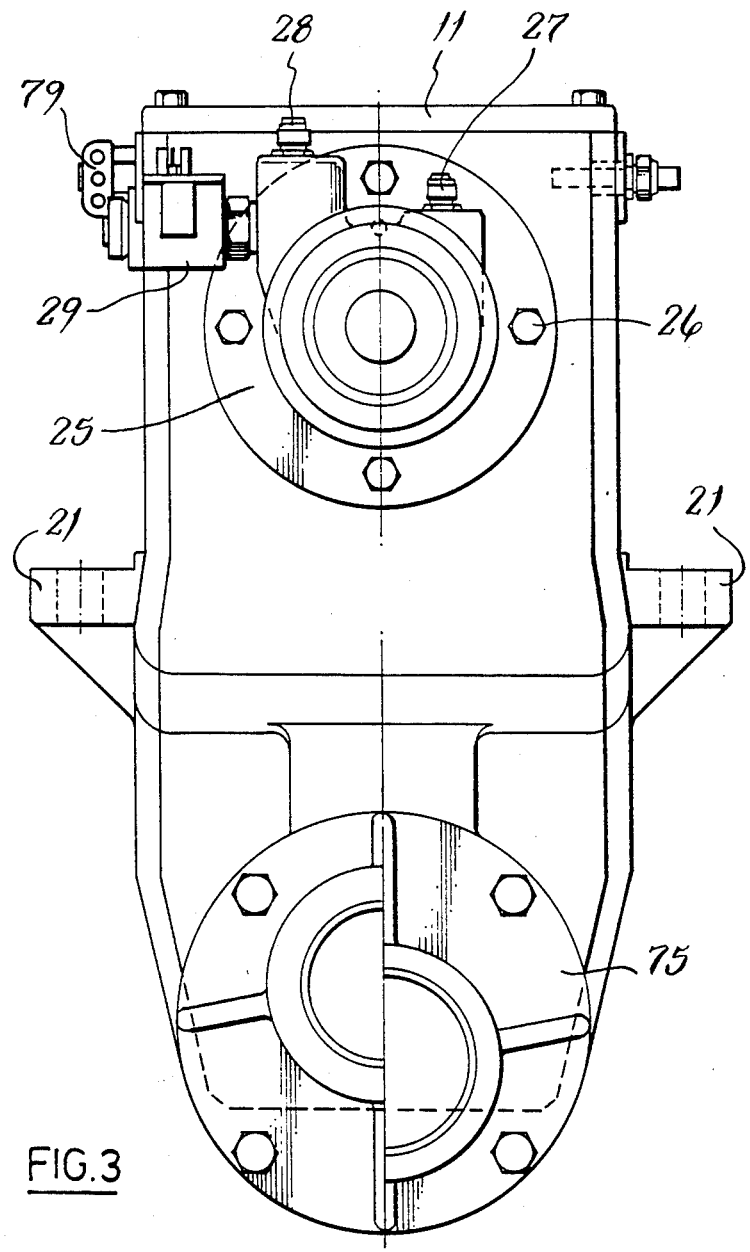
FIGS. 3 and 4 show external end views in the directions X and Y of FIG. 1.
Figure 4:
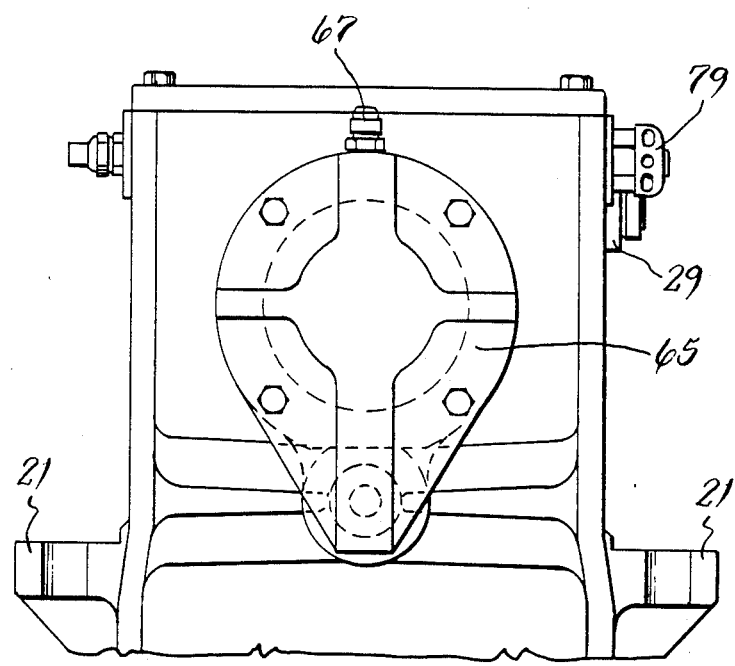

The housing 11 also includes a bearing support 75 which is lubricated by a grease nipple 74. The bearing support includes an aperture 81 to receive a pivot for the front axle. The axis 82 of aperture 81 is eccentrically disposed relative the axis 83 of the aperture 84 which receives the support 85. Thus rotation of support 75 through 180 degrees as shown in FIG. 3 provides two alternative vertical positions for the pivot axis of the associated front axle differential. This enables the same housing 11 and bearing support 75 to be able to cater for a number of different tractor drive line configurations.

It will be evident from the above that the present invention provides a PTO drive unit which includes an oil-cooled clutch to give long clutch life and which allows easy actuation of the clutch using solenoid-operated valve 29. Also continuous operation of scavenge pump 60 ensures that the level of oil within housing 11 is kept below the clutch 14 so that the power loss due to churning of the oil by the clutch is minimised.

I claim:

1. A power take-off drive unit for use at the front of a tractor, the unit comprising:
   a housing;
   an input shaft and an output shaft rotatably supported by the housing at different levels;
   A gear train within the housing connecting the two shafts;
   an oil-cooled clutch within the housing concentric with the higher shaft for connecting/disconnecting drive between the input and output shafts;
   means for supplying coolant oil to the clutch, and
   a scavenging pump driven from the input shaft for scavenging coolant oil from within the housing to ensure an oil level within said housing below the clutch to minimize the power losses due to churning of the clutch within the coolant oil while still immersing at least part of the gear train.

2. A power take-off drive unit according to claim 1 in which one of the gears of the gear train is mounted on the housing via a shaft which includes a passageway through which the coolant oil is scavenged from the housing.

3. A power take-off drive unit according to claim 1 in which the scavenging pump is of the gerotor type and is driven from the input shaft to ensure a scavenging action at all times.

4. A power take-off drive unit according to claim 1 having a brake for preventing rotation of the output shaft due to clutch drag when the clutch is disengaged.

5. A power take-off drive unit according to claim 4 in which the brake is of an electro-magnetic type.

6. A power take-off drive unit according to claim 1 in which the clutch is hydraulically actuated and uses the same fluid for actuation and cooling.

7. A power take-off drive unit according to claim 1 for use at the front of a Tractor in which the housing forms part of a front axle support of the Tractor.

8. A power take-off drive unit according to claim 7 in which the housing includes a bearing support for a front axle pivot, the bearing support including a pivot receiving aperture and being eccentrically and rotationally mounted in the housing relative to the aperture so that rotation of the bearing support relative to the housing through half a revolution results in a translational displacement of the pivot receiving aperture relative to the housing to provide an alternative axle pivot position.

9. A power take-off drive unit for use at the front of a Tractor, the unit comprising:
   a housing;
   an input shaft and an output shaft rotatably supported by the housing at different levels;
   a gear train within the housing connecting the two shafts;
   an oil-cooled clutch within the housing concentric with the higher shaft for connecting/disconnecting drive between the input and output shafts;
   means for supplying coolant oil to the clutch;
   a scavenging pump driven from the input shaft for scavenging coolant oil from within the housing to ensure an oil level within said housing below the clutch to minimise the power losses due to churning of the clutch within the coolant oil whilst still immersing at least part of the gear train, and
   a bearing support for a front axle of the Tractor carried by the housing.

* * * * *